United States Patent [19]

Ishimatsu

[11] Patent Number: 5,045,959
[45] Date of Patent: Sep. 3, 1991

[54] DISC CARTRIDGE WITH OPENING FOR EXPOSING DISC EXTENDING TO THIN PORTION OF PERIPHERAL WALL PROVIDED WITH REINFORCEMENT

[75] Inventor: Yoshikazu Ishimatsu, Kanagawa, Japan

[73] Assignee: Sony Corporation, Tokyo, Japan

[21] Appl. No.: 474,400

[22] Filed: Feb. 2, 1990

[30] Foreign Application Priority Data

Feb. 28, 1989 [JP] Japan .................... 1-22572[U]

[51] Int. Cl.⁵ .......................................... G11B 23/033
[52] U.S. Cl. .................................................. 360/133
[58] Field of Search .................. 360/133; 369/291; 206/312, 444

[56] References Cited

U.S. PATENT DOCUMENTS

| | | | |
|---|---|---|---|
| 4,802,046 | 1/1989 | Tanaka et al. | 360/133 |
| 4,839,766 | 6/1989 | Kato | 360/133 |
| 4,858,050 | 8/1989 | Ashe et al. | 360/133 |
| 4,918,559 | 4/1990 | Maruyama et al. | 360/291 |

Primary Examiner—David J. Severin
Attorney, Agent, or Firm—Alvin Sinderbrand; William S. Frommer

[57] ABSTRACT

A disc cartridge is comprised of a cartridge body accommodating a disc-shaped record medium being formed of a pair of cartridge halves, each of which has an opening extending from a central portion of at least one of the pair of cartridge halves to a peripheral wall thereof to expose one portion of the disc-shaped record medium rotatably accommodated therein to the exterior of the cartridge body, a portion of the peripheral wall to which the opening extends being thinner than the remainder of such peripheral wall. A reinforcing member of a material having a mechanical strength higher than that of the pair of cartridge halves reinforces the thinner portion of the peripheral wall to which the opening extends.

17 Claims, 4 Drawing Sheets

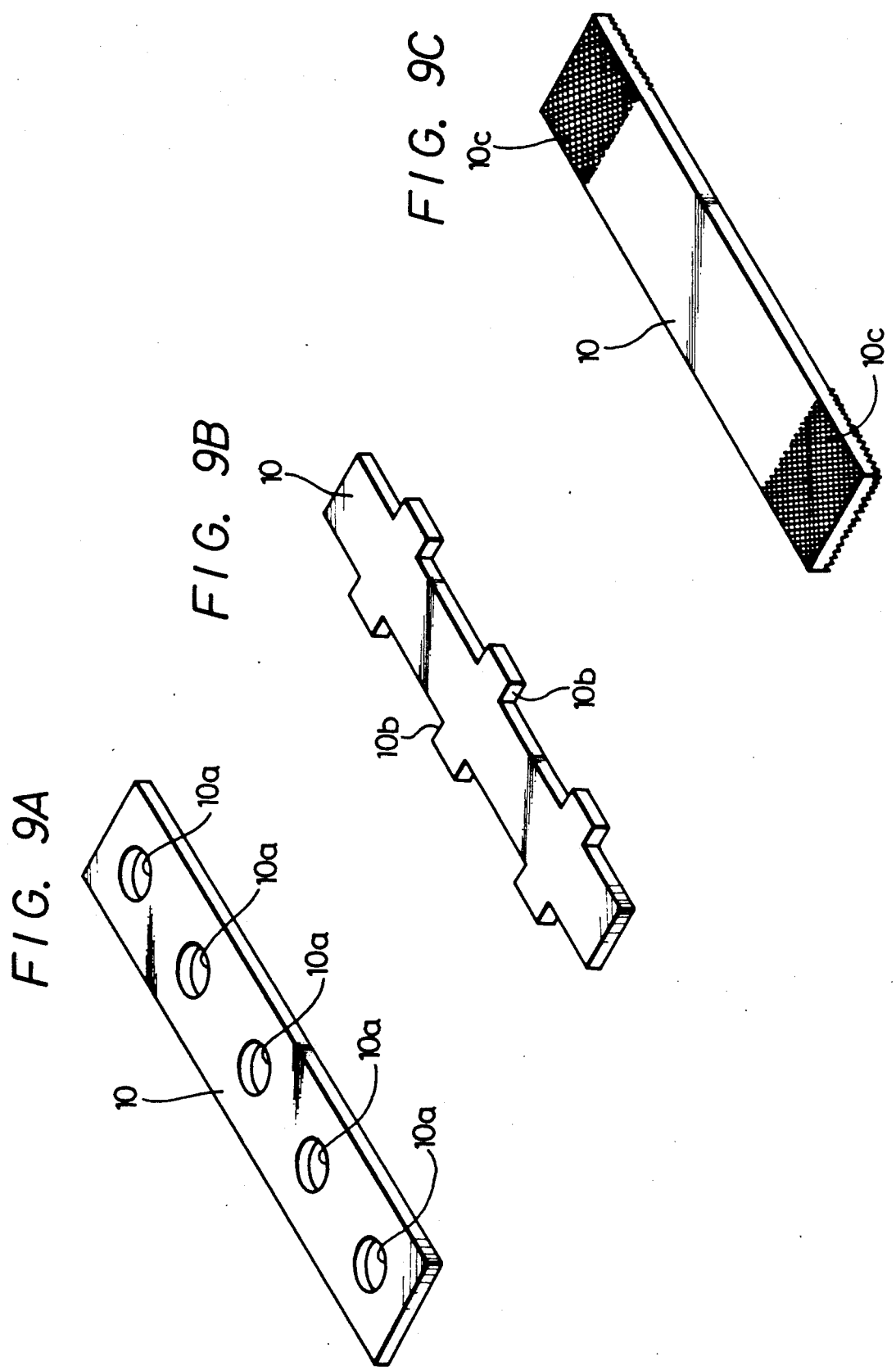

5,045,959

DISC CARTRIDGE WITH OPENING FOR EXPOSING DISC EXTENDING TO THIN PORTION OF PERIPHERAL WALL PROVIDED WITH REINFORCEMENT

BACKGROUND OF THE INVENTION

1. Field of the Invention

The present invention relates generally to a disc cartridge for a disc-shaped record medium such as a magneto-optical disc or the like in which signals can be recorded and/or reproduced while the disc is accommodated within the disc cartridge. More particularly, this invention relates to such a disc cartridge having a disc cartridge body or housing of substantially the same mechanical strength over the whole periphery thereof.

2. Description of the Prior Art

A disc cartridge which accommodates a disc-shaped record medium such as a magneto-optical disc or the like is known in the prior art. In such previously-proposed disc cartridge, an opening is formed in a flat portion of a cartridge half to expose part of a recorded region of a record medium. When the opening of the disc cartridge is opposed to a record/reproduce head of a recording and/or reproducing apparatus, the record medium can be recorded and/or reproduced while the record medium remains within the disc cartridge. In such prior-art disc cartridge, the cartridge body is large and thick overall in order to provide sufficient mechanical strength.

When the prior-art disc cartridge as loaded onto a recording and/or reproducing apparatus, due to its thickness, the distance between the record medium accommodated in the cartridge housing and a recording and/or reproducing system of the recording and/or reproducing apparatus is increased considerably. In particular, when the record medium is a magneto-optical disc, an external magnetic field generally is applied to the magneto-optical disc at a side opposite to that irradiated by light beams from an optical head. If a coil or permanent magnet which is provided as an external magnetic field generating means for generating the above-described magnetic field and the disc surface have a large distance therebetween, then it is necessary to supply the external magnetic field generating coil with a very large current, which creates problems such as large power consumption, heat generated by the coil and so on. Further, a large size permanent magnet must be used as the external magnetic field generating means, which results in a large size recording and/or reproducing apparatus and a large size mechanism for inverting the magnetic field.

In order to solve the aforementioned problems, it has been proposed that the upper and lower cartridge halves of the cartridge housing or body be reduced in thickness in order to reduce the distance between the magneto-optical disc, the optical head and the external magnetic field generating means. However, this proposal creates unavoidable problems. That is, if the upper and lower cartridge halves are reduced in thickness, then the cartridge body is unavoidably warped and deformed, which causes the record medium to be deformed by the stress produced by the deformation of the disc cartridge body. As a result, the ability of the disc cartridge to protect the record medium, which is one of the most important features of the disc cartridge, is reduced, and the reliability of the disc cartridge is lowered.

OBJECTS AND SUMMARY OF THE INVENTION

Therefore, it is an object of the present invention to provide an improved disc cartridge which can eliminate the aforementioned defects encountered in the prior art.

More specifically, it is an object of the present invention to provide an improved disc cartridge in which deformation of a cartridge body can be prevented.

It is another object of the present invention to provide an improved disc cartridge with a body or housing in which an optical disc accommodated therein can be positively protected.

It is a further object of the present invention to provide an improved disc cartridge in which an optical disc accommodated in the cartridge body can always be recorded and/or reproduced under normal conditions.

It is still another object of the present invention to provide a disc cartridge which is suitable for use with various sorts of recording and/or reproducing discs.

In accordance with an aspect of the present invention, a disc cartridge is comprised of a cartridge body for accommodating a disc record medium and which is formed of a pair of cartridge halves made of synthetic resin and at least one of which is formed with an opening extending from a central portion thereof to a peripheral wall portion so as to expose one portion of a disc-shaped record medium accommodated therein to the exterior of said cartridge body, such peripheral wall portion extending across the outer end of the opening being thinner than at least another portion of the periphery of the cartridge body, and reinforcing means being bonded to such relatively thin peripheral wall portion for reinforcing the same.

The above, and other objects, features and advantages of the present invention, will be apparent in the following detailed description of preferred embodiments when read in conjection with the accompanying drawings, in which like reference numerals are used to identify the same or similar parts in the several views.

BRIEF DESCRIPTION OF THE DRAWINGS

FIGS. 9A to 9C are perspective views illustrating examples of respective reinforcing members which are adapted for use in the disc cartridge of the present invention.

DETAILED DESCRIPTION OF PREFERRED EMBODIMENTS

Figure 2:
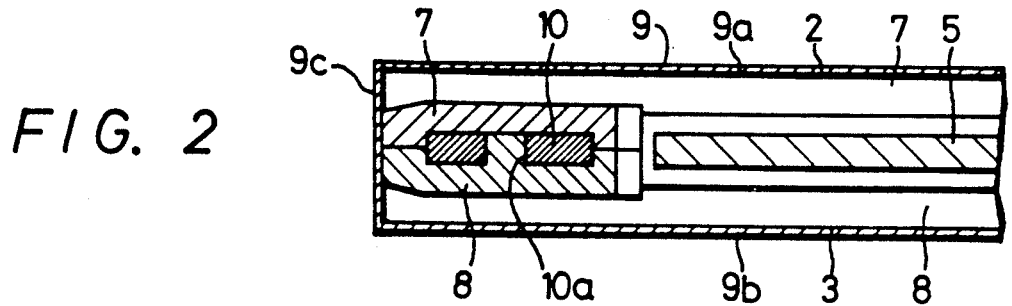
FIG. 2 is a diagrammatic view of a section of a main portion of the disc cartridge shown in FIG. 1, and illustrating the same in a longitudinal direction thereof.
Figure 3:
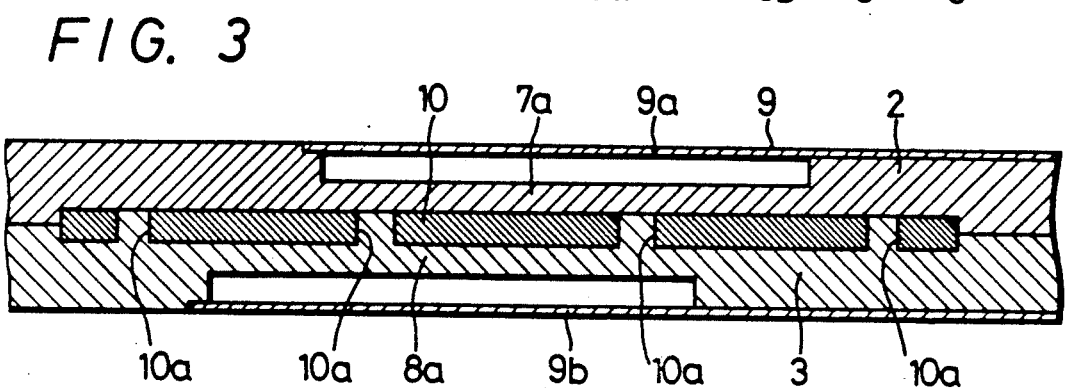
FIG. 3 is a diagrammatic view of a section of a main portion of the disc cartridge shown in FIG. 1, and illustrating the same in a lateral direction thereof.

Referring to the drawings in detail, and initially to FIGS. 1 to 3, a disc cartridge according to a first embodiment of the present invention is described hereinbelow.

Figure 1:
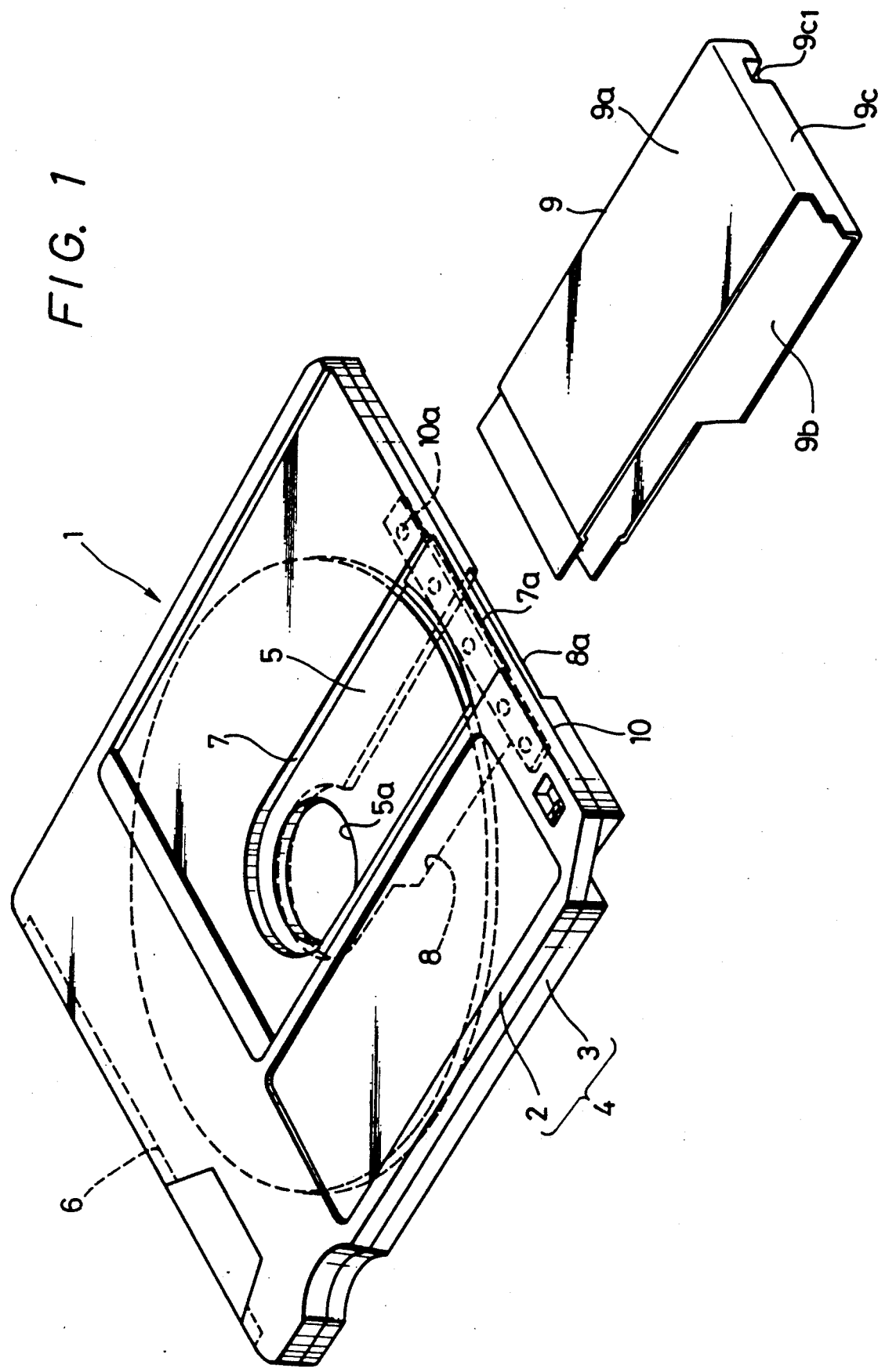
FIG. 1 is an exploded, perspective view of a disc cartridge according to a first embodiment of the present invention.

As FIG. 1 shows, there is provided a disc cartridge which is generally denoted by reference numeral 1. The disc cartridge 1 includes a cartridge body 4 comprised of upper and lower cartridge halves 2 and 3, each of which is made of a synthetic resin. Within the cartridge body 4, an optical disc 5 is rotatably accommodated as a record medium. The optical disc 5 is a magneto-optical disc or the like. The upper and lower cartridge halves 2 and 3 are fastened together by some suitable means such as welding-process or the like. In this case, a mouth is formed through a rear peripheral wall portion of the cartridge body 4. The optical disc 5 is inserted into the cartridge body 4 through the mouth and is rotatably accommodated therein. Then the mouth is closed by a lid 6.

Openings 7 and 8 are formed through the upper and lower cassette halves 2 and 3, respectively, and such openings 7 and 8 extends from a central portion corresponding to a center aperture 5a of the optical disc 5 to front peripheral wall portion of the cartridge body 4, that is a peripheral wall portion opposite to the lid 6. Therefore, the surface of the optical disc 5 around its center aperture 5a and a portion thereof extending to the outer periphery of the optical disc 5 are exposed to the exterior through the openings 7 and 8. When the disc cartridge 1 is loader in a recording and/or reproducing apparatus (not shown), a chucking plate provided within the recording and/or reproducing apparatus is inserted into the center aperture 5a of the disc 5 through the opening 7 of the upper cartridge have 2 while a turntable provided within the recording and/or reproducing apparatus is inserted into the opening 8 of the lower cartridge half 3. Further, a magnetic field generating coil or bias magnet is located at the opening 7 as magnetic field generating means, whereas an optical head (not shown) is located at the opening 8.

The disc cartridge body 4 is provided with a slidable shutter 9 to open or close the two openings 7 and 8. The shutter 9 is made of a metal plate such as stainless steel or the like or else of a hard synthetic resin. The shutter 9 is comprised of a pair of upper and lower shutter plate portions 9a, 9b, and a connecting web or front wall plate portion 9c which unitarily connects the two shutter plate portions 9a and 9b at a front side to form a substantially U-shaped configuration. The front wall plate portion 9c is provided with an engaging or notch portion $9_{c1}$ which engages an opening and/or closing member (not shown) of the recording and/or reproducing apparatus.

The shutter 9 is installed on the cartridge body 4 so that it can be freely slid in a lateral direction. When the disc cartridge 1 is loader in the recording and/or reproducing apparatus, an opening and closing member of the recording and/or reproducing apparatus is engaged with the engaging or notch portion $9_{c1}$ whereby the slide shutter 9 is slid in the lateral direction to thereby expose the openings 7 and 8.

In the first embodiment of the disc cartridge 1, coupling portions 7a and 8a are provided adjacent outer ends of the openings 7 and 8 in the upper and lower cartridge halves 2 and 3, and constitute portions of the front peripheral wall portions of the upper and lower cartridge halves 2 and 3. Coupling portions 7a and 8a are formed with a reduced width so that they are recessed with respect to the surfaces of the cartridge halves. A resilient reinforcing member 10 is secured between the coupling portions 7a and 8a as reinforcing means.

The reinforcing member 10 is formed of a nonferrous metal plate such as a duralumin plate or the like.

Through-holes 10a are formed through the reinforcing member 10 with a predetermined spacing therebetween. The front peripheral wall portions including the coupling portions 7a and 8a of the upper and lower cartridge halves 2 and 3 are welded together via these through-holes 10a by an ultrasonic welding-process, whereby the reinforcing member 10 is secured between the two opposing sides of the coupling members 7a and 8a.

As described above, the reinforcing member 10 is secured between the coupling portions 7a and 8a adjacent the outer ends of the openings 7 and 8 in the upper and lower cartridge halves 2 and 3, whereby the thin coupling portions 7a and 8a are reinforced, thus enabling the cartridge body 4 to have substantially the same mechanical strength along its entire periphery, that is, along the front and rear peripheral wall portions and the two side peripheral wall portions of the cartridge body 4. Therefore, even though the coupling portions 7a and 8a are relatively thin, bending and deformation of the cartridge body 4 can be prevented, thus assuring the positive protection of the optical disc 5 rotatably accommodated therein.

The coupling portions 7a and 8a are made thin so that they are recessed from the surfaces of the upper and lower cartridge halves 2 and 3 with the result, when the disc cartridge 1 is loaded in the recording and/or reproducing apparatus, the thin coupling portions 7a and 8a provide clearance for the recording and/or reproducing head. Where the disc 5 is a magneto-optical disc, the thin coupling portions 7a and 8a provide clearance for the magnetic field generating coil or a bias magnet provided as an external magnetic field generating means and for the optical head, so that the surface of the magneto-optical disc can be brought close to the magnetic field generating coil and the optical head. Thus, power consumption can be reduced, and heat generated by the coil can be reduced.

Figure 4:
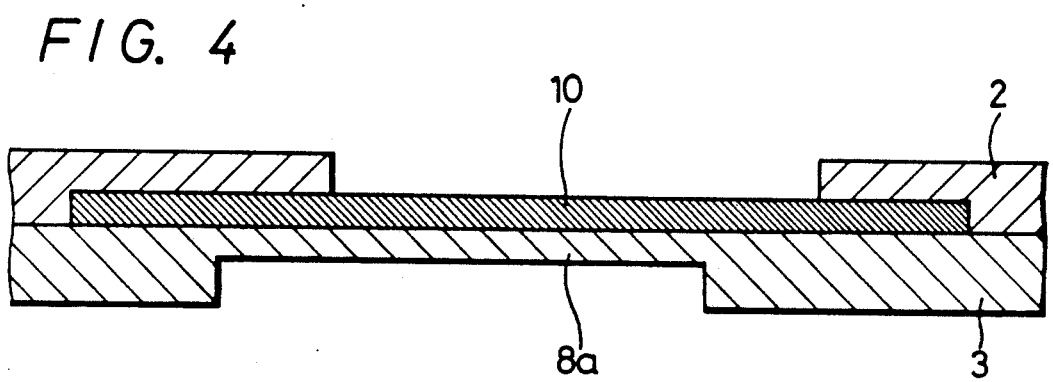
FIG. 4 to 8 are diagrammatic views in section of further embodiments of the present invention.
Figure 5:
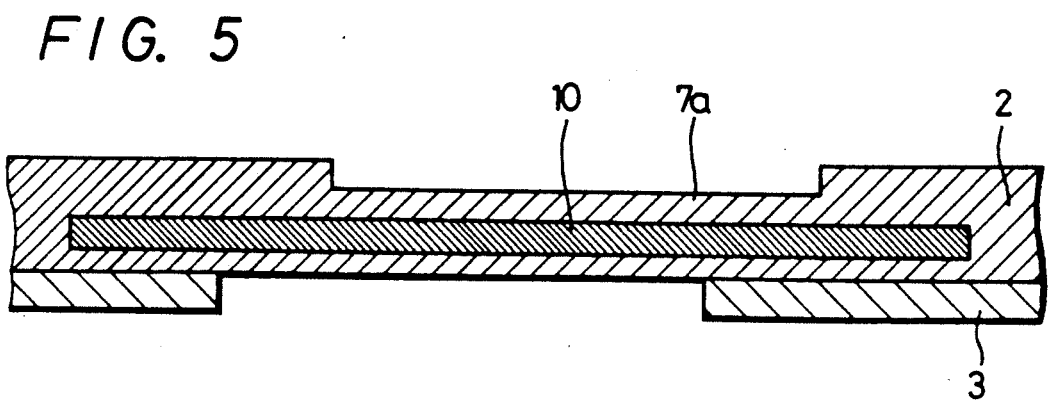
Figure 6:
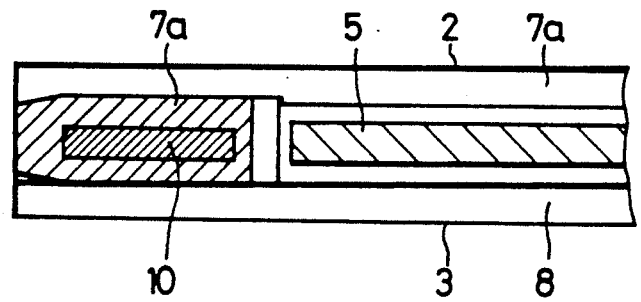

In the embodiments of FIGS. 4-6, the reinforcing member 10 is secured to one of the cartridge halves as therein shown.

More specifically, if the reinforcing member 10 is secured, for example, to the inner surface of the thin coupling portion 8a of the lower cartridge half 3 and extends over, and is also secured to respective side portions of the cartridge halves 2 and 3 beyond the coupling portion 8a, as shown in FIG. 4, then the thin coupling portion of the upper cartridge have 2 can be omitted.

Further, if the front peripheral wall portion, for example, of the upper cartridge half 2 is unitarily formed with that of the lower cartridge half 3 and the reinforcing member 10 is secured within the thus unitarily-formed front peripheral wall by forming the thin coupling portion 7a thereabout in accordance with an insert molding method as shown in FIGS. 5 and 6, then the lower cartridge half 3 can be formed without a front wall portion as shown in FIG. 5.

Figure 7:
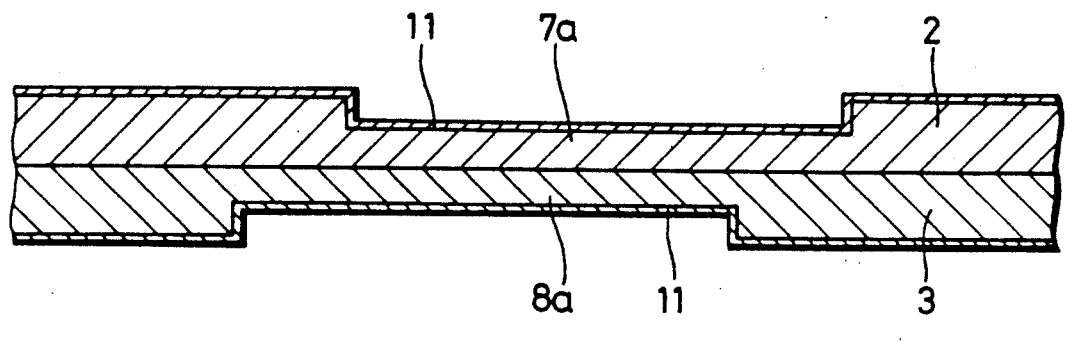

As shown in FIG. 7, in a further embodiment, the reinforcing member 10 is replaced with a non-ferrous plating layer 11 formed on outer surfaces of the cartridge halves 2 and 3 including outer surfaces of the thin coupling portions 7a and 8a thereof. The non-ferrous plating layer 11 is formed by a chromium plating-process on copper plate.

If the non-ferrous plating layer 11 is formed on the surface of a resin material, then the tensile strength thereof and the compressive strength thereof can be increased, thereby achieving the same effects as those of the preceding embodiments.

Figure 8:
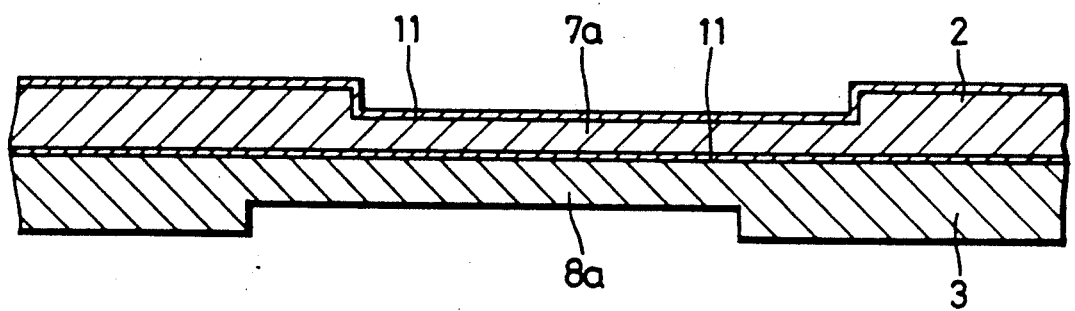

FIG. 8 shows a modification of the embodiment shown in FIG. 7, wherein the plating layer 11 is formed on one of the upper and lower cartridge halves.

More specifically, in the embodiment shown in FIG. 8, the non-ferrous plating layer 11 is formed on the outer surface and on the inner surface of the upper cartridge half 2, including those of the coupling portion 7a, whereas the non-ferrous plating layer 11 is not formed on the lower cartridge half 3. Also, if the upper and lower cartridge halves 2 and 3 are unitarily formed, it is possible to achieve effects similar to those achieved in the embodiment of FIG. 7.

In accordance with the embodiments shown in FIGS. 4 to 8, even with the provision of the thin coupling portions, bending and deformation of the cartridge body 4 can be prevented so that the optical disc 5 accommodated therein can be positively protected.

FIGS. 9A, 9B and 9C illustrate respective examples of reinforcing members which are applicable to the present invention; FIG. 9A illustrates the reinforcing member 10 used in the above-described embodiments of FIGS. 1–3; FIG. 9B illustrates an example of a reinforcing member 10 in which convex portions 10b are formed on the outer periphery of the reinforcing member 10 which is securely engaged with the cartridge halves, thus restricting the expansion and compression of the cartridge halves; and FIG. 9C illustrates another example of a reinforcing member 10 in which a plurality of concave and convex or knurled surfaces 10c are formed on the front and back surfaces at least at the respective ends of the reinforcing member 10 so as to improve the bonding property thereof to the upper and lower cartridge halves. This reinforcing member 10 of FIG. 9C is suitable where the member 10 is secured to the cartridge halves in the so-called insert molding method.

While the aforementioned flat reinforcing member serves as a reinforcing element, other possible forms of reinforcing members include rod-shaped reinforcing members which are circular, square or the like in cross section. Further, the material which forms the reinforcing member is not limited to a non-ferrous material and it is possible to use any material which is bondable to a resin material, such as a carbon fiber, a glass fiber or the like for the material used for molding the upper and lower cartridge halves.

Furthermore, the present invention is not limited to a disc cartridge for a magneto-optical disc and the present invention can be similarly applied to various sorts of disc cartridges for recording and/or reproducing discs.

As described above, according to the present invention, since a reinforcing means is provided for the thin coupling portions which provide access for the recording and/or reproducing head when the disc cartridge is loaded into the recording and/or reproducing apparatus, the disc cartridge can maintain substantially the same rigidity over the whole periphery thereof so that the record medium accommodated therein can be positively protected. Thus, the record medium can always be recorded and/or reproduced under normal conditions, whereby the reliability of the disc cartridge is improved.

Having described preferred embodiments of the invention with reference to the accompanying drawings, it is to be understood that the present invention is not limited to those precise embodiments and that various changes and modifications could be effected by one skilled in the art without departing from the spirit or scope of the invention as defined in the appended claims.

We claim as our invention:

1. A disc cartridge comprising:
   a disc-shaped record medium;
   a cartridge body including a pair of cartridge halves of synthetic resin, at least one of said cartridge halves having an opening extending from a central portion thereof to a peripheral wall so as to expose a portion of said disc-shaped record medium accommodated in said body, a portion of said peripheral wall which extends across the outer end of said opening being thin relative to the remainder of said peripheral wall; and
   reinforcing means of a material having a mechanical strength higher than that of said resin of said cartridge halves for reinforcing said thin portion of said peripheral wall.

2. The disc cartridge of claim 1; wherein at least one surface of said reinforcing means is coverted with said thin portion of the peripheral wall of said one cartridge half.

3. The disc cartridge of claim 1; wherein said reinforcing means is in contact with at least at one of said cartridge halves.

4. The disc cartridge of claim 3; wherein said reinforcing means is unitarily molded within said thin portion of the peripheral wall of said at least one of said pair of cartridge halves.

5. The disc cartridge of claim 3; wherein said reinforcing means includes a metal layer plating a surface of said thin portion of the peripheral wall of at least said one of said cartridge halves.

6. The disc cartridge of claim 3; wherein said thin portion of said peripheral wall has first and second opposite surfaces, and said reinforcing means includes respective metal layers plating said first and second opposite surfaces.

7. The disc cartridge of claim 3; wherein said thin portion of the peripheral wall of said at least one of said cartridge halves has a recess in an inner surface thereof, and said reinforcing means is situated in said recess.

8. The disc cartridge of claim 4; wherein said reinforcing means is a plate-shaped metal member.

9. The disc cartridge of claim 1; wherein the other of said pair of cartridge halves is formed with a second opening opposing the first-mentioned opening and extending to a peripheral wall of said other cartridge half, a portion of said peripheral wall of said other cartridge half extending across the outer end of said second opening and being thinner than the remainder of said peripheral wall of said other cartridge half; and
   wherein said reinforcing means also reinforces said thin portion of said peripheral wall of said other cartridge half.

10. The disc cartridge of claim 9; wherein the thin portions of said peripheral walls of the cartridge halves have respective surfaces in opposing relationship, and said reinforcing means is disposed between said respective surfaces.

11. The disc cartridge of claim 9; wherein the thin portions of said peripheral walls of the cartridge halves have oppositely facing outer surfaces; and wherein said reinforcing means comprises metal layers plating said oppositely facing outer surfaces, respectively, of said thin portions of the peripheral walls.

12. The disc cartridge of claim 9; wherein said reinforcing means comprises a plate affixed to said thin portion of the peripheral wall of said one cartridge half.

13. The disc cartridge of claim 12; wherein said plate is affixed at least partially within a recess of said thin portion of the peripheral wall of said one cartridge half.

14. The disc cartridge of claim 13; wherein said thin portion of said peripheral wall of said one cartridge half is molded integrally around said plate.

15. The disc cartridge of claim 13; wherein said plate has apertures extending therethrough and said thin portion of said thin portion of said peripheral wall of said one cartridge half has projections extending through said apertures.

16. The disc cartridge of claim 13; wherein said plate has a plurality of concave and convex surface elements thereon arranged in interlocking engagement with corresponding surface elements in said recess.

17. The disc cartridge of claim 13; wherein said plate has convex portions extending from a margin thereof and arranged in intimate contact with said recess.

* * * * *